Figure 1:
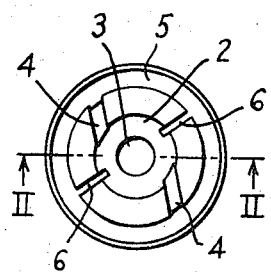
Figure 2:
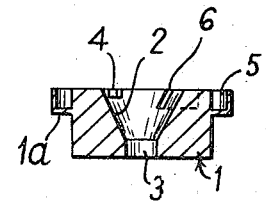
Figure 3:
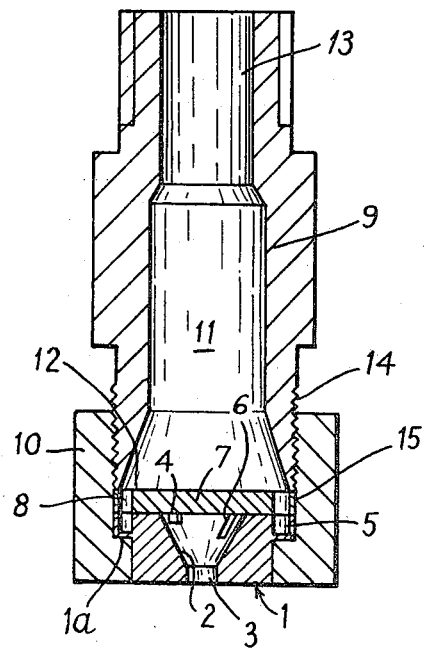
Figure 4:
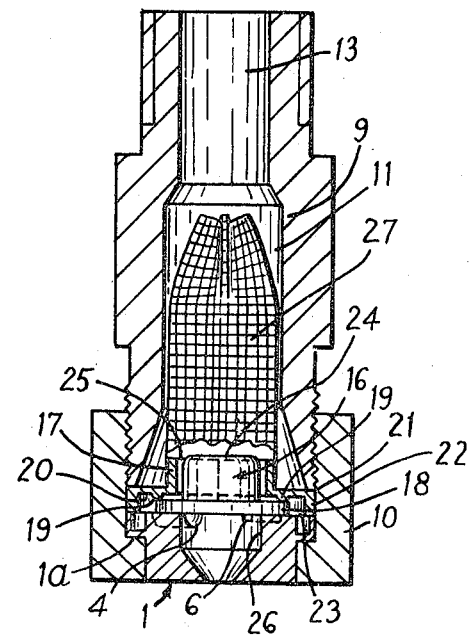

United States Patent

[11] 3,550,860

| [72] | Inventors | Arthur Kennedy Dorman;<br>Frederick Albert Bartlett, Ely, England |
|---|---|---|
| [21] | Appl. No. | 775,766 |
| [22] | Filed | Nov. 14, 1968 |
| [45] | Patented | Dec. 29, 1970 |
| [73] | Assignee | The Dorman Sprayer Company Limited<br>Ely, England<br>a British Company |
| [32] | Priority | Nov. 14, 1967 |
| [33] | | Great Britain |
| [31] | | No. 51850/67 |

[54] SPRAY NOZZLES
14 Claims, 4 Drawing Figs.

[52] U.S. Cl. .................................................. 239/491, 239/490
[51] Int. Cl. .................................................. B05b 1/34
[50] Field of Search .......................................... 239/490, 491, 492, 494, 553.3, 590.3

[56] References Cited
UNITED STATES PATENTS

| 1,033,603 | 7/1912 | Manly.................... | 239/490 |
| 2,668,084 | 2/1954 | Saxton.................... | 239/491 |

Primary Examiner—Lloyd L. King
Assistant Examiner—Thomas C. Culp, Jr.
Attorney—Holcombe, Wetherill & Brisebois

ABSTRACT: This invention discloses spray nozzles for spraying liquids, particularly those intended for agricultural and horticultural use in the spraying of crops and the like. The spray nozzle disclosed has a conical chamber provided with an outlet orifice at its narrow end, at least one primary feed passage tangential to the conical wall of the chamber and at least one secondary feed passage nontangential, preferably radial, to said conical wall.

SPRAY NOZZLES

The present invention relates to nozzles for spraying liquids and more particularly to spray nozzles intended for agricultural or horticultural use in the spraying of crops and the like.

In the field of agricultural and horticultural spraying, nozzles of the type described in our Pat. No. 862,819 have been found to be successful in reducing the formation of small spray droplets of under 150 microns, which are those generally subject to wind drift. However, it has been found that, as with other hollow cone nozzles the spray pattern will tend to take the form of a plateau with a dip directly in line with the nozzle. This makes it difficult to obtain uniform coverage over the width of a spray boom. Where multiple nozzles are used the obtaining of substantially uniform coverage is becoming increasingly important with the introduction of chemicals to which crops have a very limited resistance and where therefore a more precise application of the spray is required.

It is therefore an object of the present invention to provide a spray nozzle wherein the formation of small droplets of less than about 150 microns is reduced and which produces a spray pattern enabling substantially uniform coverage to be achieved when several nozzles are mounted on a spray boom.

The present invention consists in a spray nozzle having a conical chamber provided with an outlet orifice at its narrow end, at least one primary feed passage tangential to the conical wall of the chamber, at least one secondary feed passage non-tangential to the conical wall of the chamber and means for feeding a liquid to be sprayed through said at least one primary and secondary feed passages to the chamber, the arrangement being such that the stream of liquid from the at least one secondary feed passage impinges on the stream of liquid from the at least one primary feed passage before the latter stream meets the conical wall of the chamber the chamber.

Advantageously, a separate secondary feed passage is associated with each primary feed passage. The or each secondary feed passage may be arranged generally radially of the conical wall of the chamber.

The liquid is preferably fed to the primary and secondary feed passages through a common channel or duct.

From another aspect the invention provides a nozzle body having a conical chamber provided with an outlet orifice at its narrow end and having at least one primary feed passage tangential to the conical wall of the chamber and at least one secondary feed passage generally radial to the conical wall of the chamber and a channel or duct for feeding liquid to be sprayed to said at least primary and secondary feed passages. The feed passages and the channel or duct may advantageously be formed in that surface of the nozzle body opposite the surface containing the outlet orifice and the channel or duct may be of annular form concentric with the conical chamber.

In one preferred form of the invention the nozzle body of generally flat cylindrical or disclike form is provided with two tangential primary feed passages and two generally radial secondary feed passages extending between an annular channel or duct and the conical chamber.

The invention will now be further described, by way of example, with reference to the accompanying drawings in which:

FIG. 1 is a plan view of the nozzle body of one embodiment of spray nozzle according to the invention, FIG. 2 is a sectional view taken along the lines II–II of FIG. 1, FIG. 3 is a diametric section through one form of spray nozzle showing the nozzle in position in the holder, and FIG. 4 is a section through a modified spray nozzle according to the inventor showing the nozzle in position in the holder.

Referring to FIGS. 1 and 2, the spray nozzle comprises a disc 1 provided with a swirl chamber 2 of frustoconical form extending therethrough, the narrow end of the chamber defining the outlet orifice 3.

The surface of the disc 1 opposite to that containing the outlet orifice 3 is provided with two primary feed passages 4, constituted by grooves or channels arranged substantially tangential to the conical wall of the chamber 2. These passages 4 communicate with an annular feed duct or channel 5 through which the liquid to be sprayed is fed. The same surface is also provided with two secondary feed passages 6 constituted by grooves or channels which are narrower than those defining the primary passages. The feed passages 6 are arranged so as to extend in a radial direction with respect to the conical chamber 2 and also communicate with the annular feed duct or channel 5.

The nozzle structure is completed by a back member in the form of a flat plate 7, seen in FIG. 3, which extends across the surface of the disc 1 opposite to that containing the orifice 3 and is provided with holes 8 to permit entry of the spray liquid to the annular duct or channel 5.

The capacity of the nozzle is controlled by the size of the feed passages 4 and 6.

The nozzle assembly is mounted in a holder consisting of a body portion 9 and a retaining ring or nut 10. Body portion 9 has a cavity 11 formed with a seating 12, with which the plate 7 is in contact. The cavity communicates both with the feed channels 8 in the plate 7 and with an inlet passage or tube 13 extending from the rear end of the body and is adapted to be connected to a pipe or reservoir feeding the spraying liquid to the nozzle. The retaining ring or nut 10 screws onto an external thread 14 on the body portion and is provided with a flange 15 which engages with the recessed edge **1*a* of the disc 1, thereby holding the disc 1 and plate 7 clamped between the flange 15 and the seating 12. The disc 1 and plate 7** are both preferably made of brass.

In operation the stream of liquid from the secondary feed passages 6, impinges upon the liquid flowing in from the primary feed passages 4, before the latter reach the surface of the swirl chamber 2, and thereby deflects a portion on the spray liquid inwardly, so that the eventual cone of spray produced reached its target in a wider ring of spray than is obtained with only tangential feed passages thereby limiting the dip in the plateau spray pattern produced by the nozzle.

In the modification shown in FIG. 4 the back member is in two parts 16,17. The part 16 has a platelike portion 18 which seats on lugs 19 on a shoulder 20 forming one end of the cylindrical portion 21 of the part 17, and defines with the wall 22 of the portion 21 an annular duct or channel 23 concentric with, and in communication with, the duct or channel 5 in the disc 1. The part 16 is also provided with a cylindrical spigot portion 24 which extends into a square-sectioned passage 25 in the part 17 leading into the interior of the cylindrical portion 21. The liquid to be sprayed is fed to the duct or channel 23 through the spaces between the walls of the passage 25 and the spigot 24. In this embodiment, the conical chamber 2 has a cylindrical portion 26 to give a more obtuse angle to the conical portion. In the illustrated nozzle, the angle is 80°. By modifying the proportions of the feed passages it is possible to produce a nozzle giving a slight peak in the center of the swath.

The part 17 carries a wire gauze filter 27 to prevent sediment and the like being fed to the orifice 2 and clogging the latter.

Advantageously the secondary feed passages 6 are arranged at right angles to the diameter connecting the centers of the two tangential primary feed passages 4. By altering the angle of the secondary feed passages relative to this diameter, the shape of the spray pattern may be varied.

It will be appreciated that various modifications may be made without departing from the scope of the invention. For example, the feed passages 4 and 6 and the duct or channel 8 may be formed in the back plate.

It has been found that the droplet size can be varied greatly with variation of pressure. When operated at a low pressure, there are practically no droplets of 150 microns, but at pressures of around 50 pounds, atomisation is almost complete and the average droplet size is around 150 microns. This provides two operating pressures — one to give a large droplet for spraying materials when it is important they should not drift, and the second, a higher pressure to give very fine droplets where complete cover is required.

We claim:

1. A spray nozzle having a conical chamber provided with an outlet orifice at its narrow end, and at least one primary feed passage tangential to the conical wall of the chamber, at least one secondary feed passage nontangential to the conical wall of the chamber, and means for feeding a liquid to be sprayed through said at least one primary and secondary feed passages to the chamber, the arrangement being such that the stream of liquid from the at least one secondary feed passage impinges on the stream of liquid from the at least one primary feed passage before the latter stream meets the conical wall of the chamber.

2. A spray nozzle as defined in claim 1, wherein said at least one secondary feed passage is generally radial to the conical wall of the chamber.

3. A spray nozzle as defined in claim 1, wherein a channel is provided for feeding liquid to be sprayed to said at least one primary and secondary feed passages.

4. A spray nozzle as defined in claim 3, wherein said conical chamber is formed in a nozzle body and the feed passages and the channel are formed in that surface of the nozzle body opposite the surface containing the outlet orifice.

5. A spray nozzle as defined in claim 4, wherein said channel is of annular form concentric with the conical chamber.

6. A spray nozzle as defined in claim 4, wherein the nozzle body is of generally flat cylindrical form and is provided with two tangential feed passages and two generally radial secondary feed passages extending between the annular feed channel and the conical chamber.

7. A spray nozzle as defined in claim 6, wherein the secondary feed passages are arranged at right angles to the diameter connecting the centers of the two tangential primary feed passages.

8. A spray nozzle as defined in claim 1, wherein a separate secondary feed passage is associated with each primary feed passage.

9. A spray nozzle as defined in claim 4, wherein the end of the conical chamber opposite to the outlet orifice is closed by a separate back member.

10. A spray nozzle as defined in claim 9, wherein said back member is a flat plate, extending across that surface of the nozzle body opposite to the surface containing the outlet orifice and provided with holes to permit entry of the spray liquid to the annular channel.

11. A spray nozzle as defined in claim 9, wherein said back member is in two parts, one part being in the form of a plate extending across the end of the conical chamber opposite to the outlet orifice and at least the end portions of the primary and secondary feed passages adjacent the conical chamber, and which is seated in a hollow cylindrical portion of the other part and defines therewith an annular channel concentric with, and in communication with, said annular channel in the nozzle body, said other part having a passage for feeding liquid to be sprayed to the annular channel in said back member.

12. A spray nozzle as defined in claim 3, wherein said conical chamber is formed in a nozzle body and the end of the chamber opposite to the orifice is closed by a separate back member, the feed passages and the channel being formed in said back member.

13. A spray nozzle as defined in claim 1, wherein said nozzle is mounted in a holder comprising a body portion having an inlet passage for the liquid to be sprayed and a retaining ring or nut which holds the nozzle against the end of said portion.

14. A spray nozzle as defined in claim 1, wherein the conical chamber includes a cylindrical portion at its end opposite to the orifice.